United States Patent
Cheiky

[19]

[11] Patent Number: 5,615,717
[45] Date of Patent: Apr. 1, 1997

[54] ELECTROLYTE DISTRIBUTING SYSTEM AND METHOD

[75] Inventor: Michael C. Cheiky, Santa Barbara, Calif.

[73] Assignee: Dreisbach Electromotive Inc., Santa Barbara, Calif.

[21] Appl. No.: 361,770

[22] Filed: Dec. 22, 1994

[51] Int. Cl.⁶ ............... B65B 1/04; B65B 3/04
[52] U.S. Cl. .................. 141/100; 141/34; 141/302; 141/325; 141/144; 137/624.11; 137/887; 137/260
[58] Field of Search .................. 141/34, 67, 100, 141/103, 104, 105, 234, 236, 237, 242–245, 285, 301, 302, 311 R, 325, 367, 144, 163, 185, 191; 222/330, 485, 486; 137/260, 887, 870, 865, 624.11, 625.12

[56] References Cited

U.S. PATENT DOCUMENTS

| | | | |
|---|---|---|---|
| 2,946,576 | 7/1960 | Coulter | 222/485 |
| 3,483,042 | 12/1969 | Hulse | 136/162 |
| 3,630,786 | 12/1971 | Ibaraki | 136/170 |
| 3,892,595 | 7/1975 | Bell et al. | 136/162 |
| 4,006,281 | 2/1977 | Markin et al. | 141/311 R |
| 4,289,176 | 9/1981 | Evans | 141/35 |
| 4,350,185 | 9/1982 | Quist | 137/260 |
| 4,702,972 | 10/1987 | Matsumoto | 429/34 |
| 4,894,294 | 1/1990 | Ashizawa et al. | 429/18 |
| 5,011,747 | 4/1991 | Strong et al. | 429/27 |
| 5,068,160 | 11/1991 | Clough et al. | 429/72 |
| 5,148,841 | 9/1992 | Graffin | 141/243 |
| 5,284,176 | 2/1994 | Campau | 137/260 |

*Primary Examiner*—David J. Walczak
*Assistant Examiner*—Steven O. Douglas
*Attorney, Agent, or Firm*—Renner, Otto, Boisselle & Sklar

[57] ABSTRACT

A method of providing electrolyte to an electrolyte starved battery includes the steps of supplying electrolyte from a source to a dispenser and dispensing the electrolyte from the dispenser in a preplanned sequence to each of a number of electrolyte inputs in the electrolyte starved battery. Related devices for accomplishing such a method are also disclosed.

17 Claims, 4 Drawing Sheets

ELECTROLYTE DISTRIBUTING SYSTEM AND METHOD

FIELD OF THE INVENTION

This invention relates generally to a system and method of supplying batteries with fluid, particularly to a system and method for supplying rechargeable, electrolyte starved metal-air batteries with water and electrolyte, and more particularly to a system and method for supplying electrolyte to rechargeable electrolyte starved zinc-air cells suitable for use in traction batteries for electric vehicles.

BACKGROUND OF THE INVENTION

Metal-air batteries, such as zinc-air batteries, offer the advantage of very high energy densities (up to 300 Wh/kg) over known conventional batteries, like lead-acid batteries, used to power electric vehicles. This is possible because, unlike a conventional battery cell that is comprised of two metal electrodes, a metal-air battery cell has only one metal electrode and a light-weight air cathode that absorbs air. For example, in a zinc-air cell, oxygen in the air is converted to hydroxyl ions, which oxidize the zinc anode, and water and electrons are released to produce electricity. The high energy density of metal-air batteries, like zinc-air batteries, translates into long operating range for electric vehicles, which in combination with low commercial production costs and a high degree of safety for both the environment and the consumer, offer significant advantages over conventional batteries for use in large consumer applications, like electric vehicles.

Experimental rechargeable metal-air batteries, like zinc-air batteries, have been built for use in electric vehicles and these batteries use a water-based electrolyte to convert oxygen to hydroxyl ions, which react with the zinc, to produce electricity. Because the air cathode of a metal-air cell passes water molecules as easily as oxygen molecules (due to similar molecular size and polarization), water loss is often experienced from the electrolyte if the ambient humidity is less than the equilibrium relative humidity value for the metal-air cell. This drying out of the cell may cause failure. Additionally, heat produced by the electrolytic reaction tends to increase water loss from the cell.

Batteries are sized to match the application in which the particular battery will be used. High-power applications, like powering traction motors in electric vehicles, tend to use large batteries including hundreds of individual metal-air cells electrically connected within the battery. Smaller batteries such as those used in consumer electronic devices can often use smaller batteries having fewer metal-air cells. The larger the battery, the more heat the battery will produce in operation. When larger quantities of heat are generated, more water evaporates from the electrolyte within the battery. Consequently, the electrolyte often must be replenished, especially in larger batteries, or the battery may fail. An automatic system to monitor cell performance and to add electrolyte to the battery when needed is desired in order to make larger batteries, such as traction batteries, easier to maintain and operate.

In addition to water loss from the electrolyte, there are other problems associated with electrolyte that interfere with performance of a metal-air battery. Carbonation of the electrolyte, due to a reaction of carbon dioxide with certain cell components and the electrolyte, interferes with the electrochemical reaction. In a zinc-air battery, uneven distribution of the electrolyte near the zinc anode, resulting in local concentration gradients of electrolyte, contribute to dendrites of zinc growing from the zinc anode to the air cathode during cycling of the cell. Eventually, dendrite formation may cause the cell to short out. Additionally, leakage of excess electrolyte can cause cell failure and corrosion of cell surroundings.

External replenishment methods and systems for batteries with a limited number of cells are known, wherein electrolyte is manually added to a common solution tank and is dispensed to the cells via ports and/or ducts under vacuum-induced pressure. U.S. Pat. No. 3,483,042 to Hulse, U.S. Pat. No. 3,630,786 to Ibaraki, et al., and U.S. Pat. No. 3,892,595 to Bell, et al. disclose such one-time manual methods and devices for filling battery cells with electrolyte.

U.S. Pat. No. 4,702,972 to Matsumoto discloses an electrolyte replenishing system specifically for a laminated type fuel cell wherein excess electrolyte is collected and recycled by means of a pump. Matsumoto '972 provides a system for continuous replenishment of electrolyte, but is specifically designed, for use with a laminated type fuel cell and is not automated to provide specific amounts of electrolyte at specific time intervals.

Therefore, a distributing system is desired that can satisfactorily replenish water and/or electrolyte loss experienced by a battery used in large consumer applications, like electric vehicles, and can effectively control electrolyte levels within the battery, such that only enough electrolyte as is needed for operation of the battery is provided on a periodic, automatic basis.

SUMMARY OF THE INVENTION

The present invention provides an electrolyte distributing system and method for providing electrolyte to an electrolyte starved battery in a preplanned sequence. The system preferably includes or is associated with an electrolyte reservoir and feed system, a control system for monitoring the performance of each cell or group of cells in a battery, and an apparatus for controlling the amount of electrolyte supplied to each cell or group of cells as determined by the control system.

In accordance with one aspect of the invention, a method of providing electrolyte to an electrolyte starved battery includes the steps of supplying electrolyte from a source to a dispenser, and rotating the dispenser to dispense the electrolyte from the dispenser sequentially to each of a plurality of electrolyte inputs in the electrolyte starved battery.

In accordance with another aspect of the invention, an electrolyte dispensing device includes a rotating dispenser and stationary manifold, the rotating dispenser including a first electrolyte passageway leading from a dispenser input of the rotating dispenser to a dispenser output of the rotating dispenser confronting the manifold, and the stationary manifold having a number of electrolyte passageways, each passageway having a manifold input confronting the rotating dispenser and a manifold output, the manifold inputs being arranged along a circular path circumscribed by the dispenser output as the rotating dispenser rotates.

In accordance with another aspect of the invention, a self-distributing electrolyte starved metal-air battery includes a dispensing device including an apparatus for selectively coupling a supply of electrolyte to one of a plurality of feed lines, and a plurality of metal-air cells, each including a metal anode, an air cathode, an anode electrolyte absorber adjacent said anode, a cathode electrolyte absorber adjacent said cathode, a separator separating said electrolyte absorbers, an electrolyte input coupled to one of the plurality of feed lines for supplying electrolyte to the absorbers at a supply side of the cell and a drain for draining excess electrolyte from said electrolyte absorbers at a drain side of the cell.

In accordance with a further aspect of the invention, a method of providing electrolyte to an electrolyte starved battery includes the steps of supplying electrolyte from a source to a dispenser, and dispensing the electrolyte from the dispenser in a preplanned sequence to each of a plurality of electrolyte inputs in the electrolyte starved battery.

In accordance with a still further aspect of the invention, an electrolyte dispensing device includes a supply valve for selectively coupling a supply of electrolyte to a manifold, a plurality of feed valves, each feed valve selectively coupling the manifold to the electrolyte input of at least one battery cell, and a processor for controlling the supply valve and the feed valves to generally sequentially provide electrolyte to the battery cells.

The foregoing and other features of the invention are hereinafter fully described and particularly pointed out in the claims, the following description and the annexed drawings setting forth in detail certain illustrative embodiments of the invention, these being indicative, however, of but a few of the various ways in which the principles of the invention may be employed. It will be appreciated that the scope of the invention is to be determined by the claims and the equivalents thereof.

DETAILED DESCRIPTION OF THE INVENTION

Figure 1:
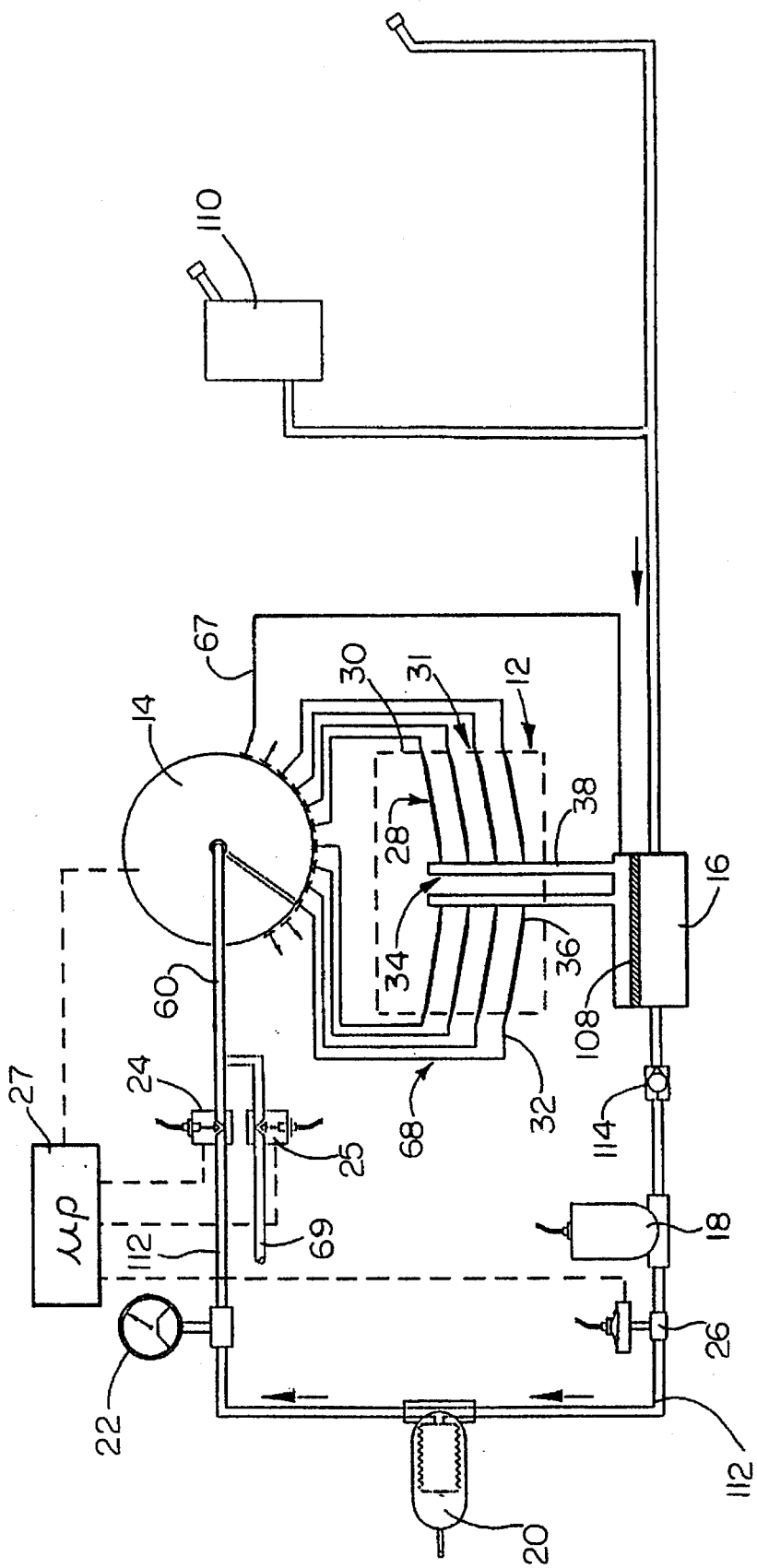
FIG. 1 is a schematic illustration of a battery system including one embodiment of an electrolyte distributing system used with an electrolyte starved zinc-air battery.

Referring to FIG. 1, there is illustrated schematically a battery system 10 including an electrolyte starved battery 12 and an electrolyte distributing system 14 in accordance with the present invention. The electrolyte distributing system 14 of the present invention is described herein with reference to an exemplary use with an electrolyte starved metal-air cell battery, and more particularly a zinc-air cell battery. One such metal-air cell battery is disclosed in co-pending U.S. patent application Ser. No. 08/361,778 filed Dec. 22, 1994, entitled "Electrolyte Starved Metal-Air Battery", and naming Michael C. Cheiky as inventor; the disclosure of which is incorporated by this reference. However, it will be appreciated that the described battery is merely exemplary and that the electrolyte distributing system 14 may be used to supply electrolyte to any battery requiring the periodic distribution of electrolyte to cells within the battery.

In addition to the metal-air battery 12 and the electrolyte distributing system 14, the battery system 10 further includes an electrolyte collecting tank 16, a pump 18, an accumulator tank 20, a pressure sensor 22, solenoid valves 24 and 25 and switching element 26 for controlling operation of the pump and flow of electrolyte from the accumulator to the electrolyte distributing system, respectively. Control of the valves 24 and 25, switching element 26 and electrolyte distributing system 14 is preferably performed by a microprocessor 27. The solenoid valves 24 and 25 control the flow of electrolyte and "scrubbed" air (air in which the carbon dioxide has been substantially removed), respectively, to the electrolyte distributing system 14.

The exemplary metal-air battery 12 includes a number of rechargeable, electrolyte starved zinc-air cells 28 contained within a battery housing 30. Preferably, the zinc-air cells 28 are stacked generally vertically, with each cell inclined approximately at a 6° to 10° angle to horizontal. At the elevated end 31 of each cell 28 is an electrolyte injection port 32 through which electrolyte is provided to the cell from the electrolyte distributing system 14. At the lower end 34 of each cell 28 are one or more drains 36 for draining excess electrolyte from each cell to a common drain 38. The excess electrolyte drained from each cell is collected, recycled and returned to the zinc-air cells 28 through the electrolyte collecting tank 16, the pump 18, the electrolyte accumulator 20 and the electrolyte distributing system 14. Preferably the distributing system 14 distributes electrolyte to the cells 28 of the battery 12 individually and sequentially although the distributing system may distribute electrolyte to groups of cells at the same electrical potential.

Figure 2:
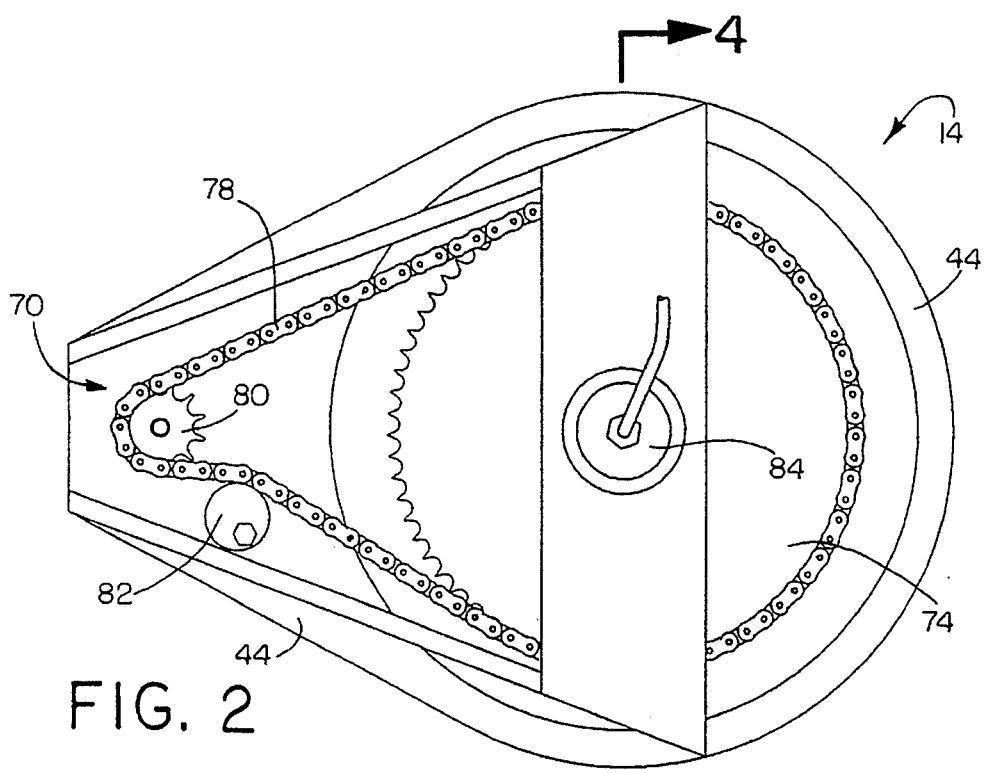
FIG. 2 is a top view of an electrolyte distributing system.
Figure 3:
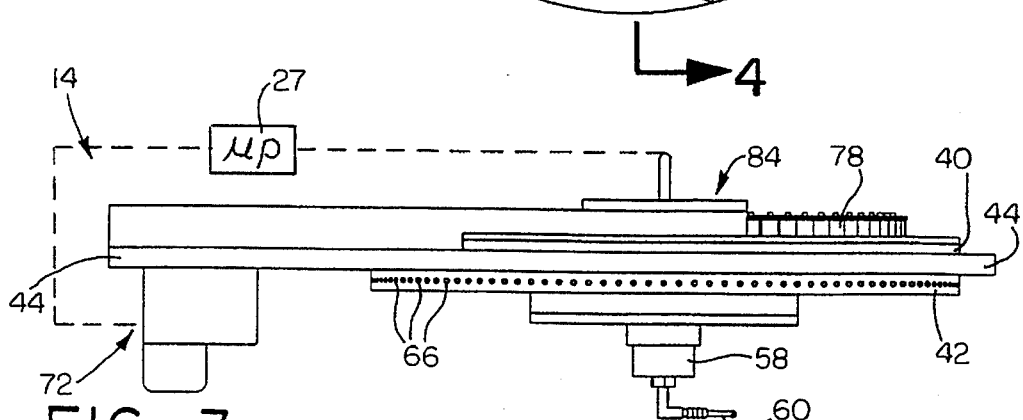
FIG. 3 is a side view of an electrolyte distributing system.
Figure 4:
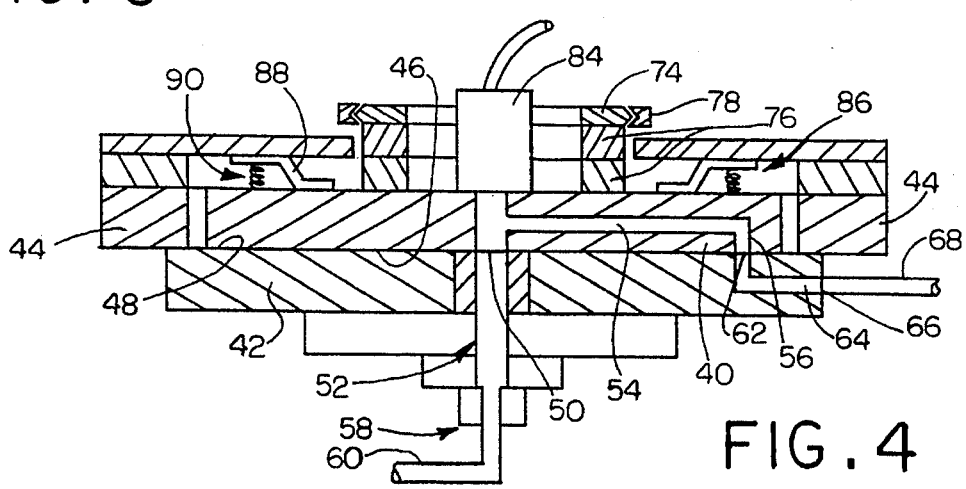
FIG. 4 is a cross-sectional view of the electrolyte distributing system taken along line 4—4 in FIG. 2.

One embodiment of an electrolyte distributing system 14 is shown in a top view and in an elevation view in FIGS. 2 and 3, respectively, with FIG. 4 illustrating a cross-sectional view of the system taken generally along line 4—4 in FIG. 2. The electrolyte distributing system 14 includes a rotating electrolyte dispenser 40 and a stationary manifold 42 which cooperate to distribute electrolyte sequentially to the several zinc-air cells 28 of the battery 12. The stationary manifold 42 and rotational dispenser 40 are preferably disk shape with the stationary manifold affixed to a frame 44.

Figure 5:
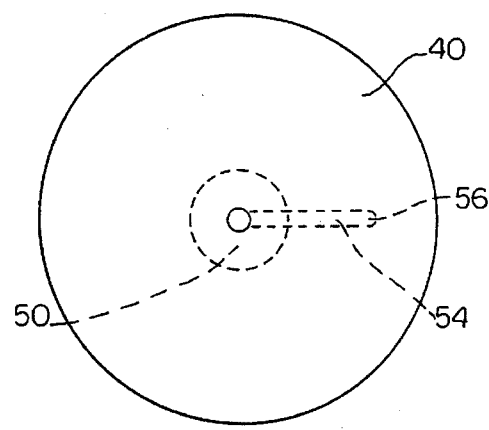
FIG. 5 is a top view of the rotating dispenser of the electrolyte distributing system.

The rotating dispenser 40 and stationary manifold 42 are provided with flat, smooth confronting surfaces 46 and 48, respectively, to allow for free rotational movement of the surfaces relative to one another and to provide a fluid seal between the surfaces. The rotating dispenser 40, as seen in FIGS. 4 and 5, includes an electrolyte input 50 concentric with the axis of rotation of the dispenser and a fluid inlet passageway 52. An interior electrolyte passage 54 leads from the electrolyte input 50 to a dispenser outlet 56 which opens to the lower surface 46 of the rotating dispenser 40 confronting the manifold 42. The dispenser output 56 is preferably somewhat elongated in a radial direction to provide a generally oval shape. A rotating joint 58 is provided to couple the dispenser input 50 to a stationary electrolyte supply line 60 (see FIGS. 1 and 4).

Figure 6:
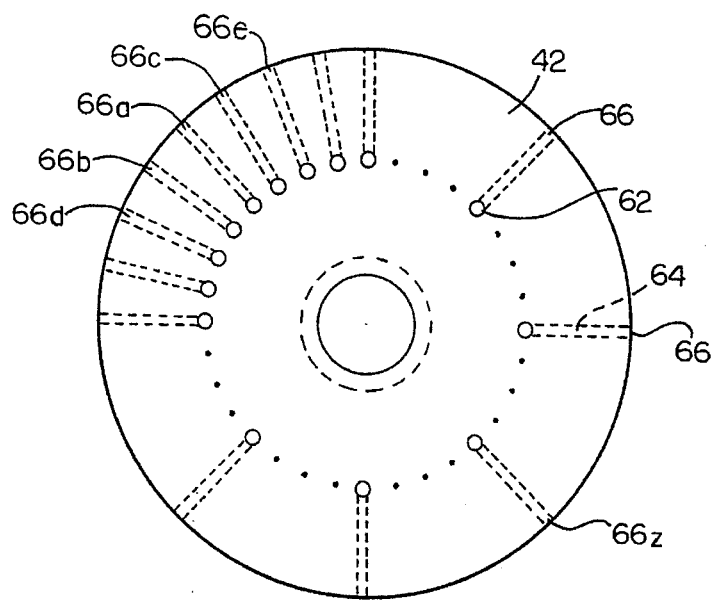
FIG. 6 is a top view of the stationary manifold of the electrolyte distributing system.

As seen in FIG. 6, the stationary manifold 42 includes a number of manifold inputs 62 radially offset from the center of the manifold along a path circumscribed by the dispenser outlet 56 of the rotating dispenser 40 as it rotates relative to the stationary manifold 42. There is preferably a separate manifold input 62 corresponding to each cell in the battery 14, although a single manifold input may be used for a grouping of cells in the battery at the same electrical potential. The manifold inputs 62 are preferably equally spaced around the manifold 42. Consequently, in the instant example with a battery 14 having 120 metal-air cells therein, there would be preferably 120 manifold inputs 62 corresponding to individual cells and one or more additional inputs provided as flushing ports equally spaced around the manifold 42. An interior electrolyte passage 64 extends radially outwardly from each manifold input 62 to emerge at a separate manifold output 66 along the periphery of the manifold 42. Each manifold output 66 is coupled to a line 68 which supplies electrolyte from the manifold output to a corresponding input 32 of a cell 28 or coupled to a line 67 through which electrolyte can be routed to the collecting tank 16 bypassing the cells 28.

As noted above, one or more of the manifold inputs 62 and outputs 66 may serve as flushing ports in which case they would be fluidly coupled to the electrolyte collecting tank 16 through lines 67 (see FIG. 1). In this manner, it is possible to flush electrolyte which has become overly diluted or concentrated as a result of the system sitting idle for an extended period of time from the lines of the system (i.e., lines 112) back to the collecting tank 16 so that well-mixed electrolyte can be used to replenish the cells 28. The flushing ports may also be used to determine if the system is working properly or to attempt to clear the lines in the system.

Preferably, to minimize the risk of shunt currents between cells 28 in the battery 12, the manifold inputs 62 corresponding to cells at significantly different potential differences are adequately separated so that the electrolyte distributed through a feed line 68 to a cell at one potential can sufficiently drain before electrolyte is distributed to a feed line corresponding to a cell at a significantly different potential. For example, the cells 28 at the greatest potential difference can be connected to manifold outputs 66 located substantially 180 degrees apart on the manifold 42, with the potential difference between cells connected to adjacent manifold outputs minimized. To explain, consider manifold output 66a as being connected to the cell 28 at the lowest potential in the battery and the manifold output 66z as connected to the cell at the highest potential and the manifold outputs 66b–66e being at progressively higher potentials as their respective reference letters near "z". The manifold outputs 66 would then be allocated to cells 28 as represented in FIG. 6. Manifold output 66a would have manifold outputs 66b and 66c to either side, with manifold output 66d nearest manifold output 66b and manifold output 66e nearest manifold output 66c and so on around the manifold, with the manifold output connected to the cell at the highest potential, in this example manifold output 66z, diametrically opposed to the manifold output connected to the cell at the lowest potential, manifold output 66a. In this manner, the potential difference between cells connected to adjacent manifold outputs 66 around the manifold 42 is minimized and the possibility of shunt currents is decreased throughout an electrolyte distribution cycle.

Other factors which increase the resistance of the system to shunt currents include increasing the physical length of the electrolyte feed lines 68, maximizing electrical isolation by distributing electrolyte to one cell at a time, using electrically non-conductive materials where possible, and using an air blow-down, discussed below, to clear the electrolyte feed lines before and after an electrolyte feeding cycle.

In operation, the accumulator 20 provides electrolyte to the electrolyte distributing system 14 for replenishment of the cells 28 through the valve 24 along the stationary line 60 connected to the rotating joint 58. The electrolyte flows through the rotating joint 58 through the fluid passageway 52 and the dispenser input 50 to the dispenser output 56 through the interior electrolyte dispensing passage 54. As the rotating dispenser 40 rotates, the dispenser outlet 56 follows a circular path passing over each manifold input 62. Since the confronting surfaces 46 and 48 of the rotating dispenser 40 and stationary manifold 42, respectively, are flat and the confronting surface 46 of the rotating dispenser is biased against the confronting surface 48 of the stationary manifold, when the dispenser outlet 56 is at a point between manifold inputs 62, flow from the dispenser outlet 56 is blocked. When the dispenser outlet 56 is generally aligned above a manifold input 62, electrolyte will flow from the dispenser outlet 56 through a manifold input 62, the internal electrolyte passage 64 and from the manifold 42 through the manifold output 66 to a corresponding cell 28 over a feed line 68. By connecting one cell or parallel strings of cells at a single electrical potential to the feed electrolyte at a single time, harmful shunt currents across the battery pack through the electrically conductive electrolyte are reduced. The confronting surface 46 of the rotating dispenser 40 may also be provided with leading and trailing vents, respectively located before and after the dispenser output 56 relative to the direction of rotation of the rotating dispenser, to allow the electrolyte flow path to the cells 28 to breathe and to therefore minimize air pockets which might obstruct the flow of electrolyte to a cell.

To minimize leakage between the confronting surfaces 46 and 48 of the rotating dispenser 40 and stationary manifold 42, the rotating dispenser is biased against the stationary manifold by biasing elements 86 disposed around the rotating dispenser. The biasing elements 86 include a leaf spring 88 mounted to the rotating dispenser 40 and a spring 90 positioned between the rotating dispenser and the cantilevered portion of the leaf spring.

Rotation of the rotating dispenser 40 is accomplished by a chain drive mechanism 70 and motor 72 (See FIGS. 2 and 4). A sprocket 74 is positioned above the rotating dispenser 40 by spacers 76. The sprocket 74 is engaged with a chain 78 which is in turn engaged with a suitable gear 80 driven by the motor 72. A tensioning mechanism 82 may be provided to allow adjustment of the chain tension or to maintain constant tension. The sprocket 74 preferably has a relatively large diameter to distribute force over a large portion of the rotating dispenser 40. The rotational movement and rotational speed of the motor 72 and chain drive 78 are preferably controlled by the microprocessor 27 so that the speed that the rotating dispenser 40 rotates and the rotational position and dwell time of the rotational dispenser can be controlled.

Disposed adjacent the rotating dispenser 40 and stationary manifold 42 is an optical encoder 84 which communicates to the microprocessor 27 its location vis-a-vis an input of the stationary manifold. Based on the parameters of its programming, the microprocessor 27 turns the valve 24 on for a specified length of time, for example two seconds, allowing fluid to flow from the accumulator tank 20, via the rotating dispenser 40 and stationary manifold 42, to the cell or groups of cells to be replenished with electrolyte. After the specified length of time has elapsed, the microprocessor 27 turns the valve 24 off, shutting off the flow of fluid from the accumulator tank 20. The microprocessor 27 then turns on the motor 72 for a specified length of time, which drives and thus rotates the rotating dispenser 40 through the chain 78 and sprocket 74 to align the dispenser outlet 56 with the next manifold input 62. The encoder 84 then communicates the rotational position of the rotational dispenser 40 to the microprocessor 27 again and the entire sequence of steps is repeated. In some instances the microprocessor 27 may also cause electrolyte to be directed through the rotating dispenser 40 through a flushing port in the stationary manifold 42 for a desired period of time to flush electrolyte through the system. Between successive electrolyte replenishing cycles, the system may also blow scrubbed air through the rotating dispenser 40 and stationary manifold 42 to the cells 28 to remove remaining electrolyte and any electrolyte film from the feed lines 68. This is accomplished by the microprocessor 27 by closing solenoid valve 24, and opening solenoid valve 25 to supply scrubbed air from the air input 69 to the supply line 60 coupled to the rotating dispenser 40.

Hydraulic head, which is a function of the vertical distance between the distributing, system and the cell, or groups of cells, being fed, affects the uniformity of fluid flowing to the cell(s) such that the cell(s) with greater vertical distance from the distributing system will experience greater fluid flow provided all other factors, like number or length of feedings, are equal. To counter this effect and to provide for uniform flow of fluid to all cells, the length and/or number of fluid feedings can be adjusted. Differing dwell times and/or number of fluid feedings can be controlled by programming the microprocessor 27 such that cells with a closer vertical distance can have longer feed times. The microprocessor 27 can also be programmed to monitor cells 28 for leakage and to dispense more electrolyte to these cells. Additionally, mechanical deficiencies of the distributing system 14, like different output sizes in the perimeter of the stationary manifold, which result in cells receiving differing amounts of electrolyte can be corrected by adjusting the dwell time that the rotating dispenser 40 feeds a particular cell 28.

The components of the electrolyte distributing system 14 which come into contact with the electrolyte, for example, the rotating dispenser 40 and the stationary manifold 42, are preferably constructed of a material which is not adversely affected by the electrolyte and any caustic action it may have. Such components are preferably constructed of at least one polyolefin, preferably polypropylene as it is light weight, self lubricating and has anti-corrosion and anti-seize properties. Other components of the electrolyte distributing system 14 are preferably also constructed of polypropylene or a similar plastic to minimize the weight of the system.

Figure 7:
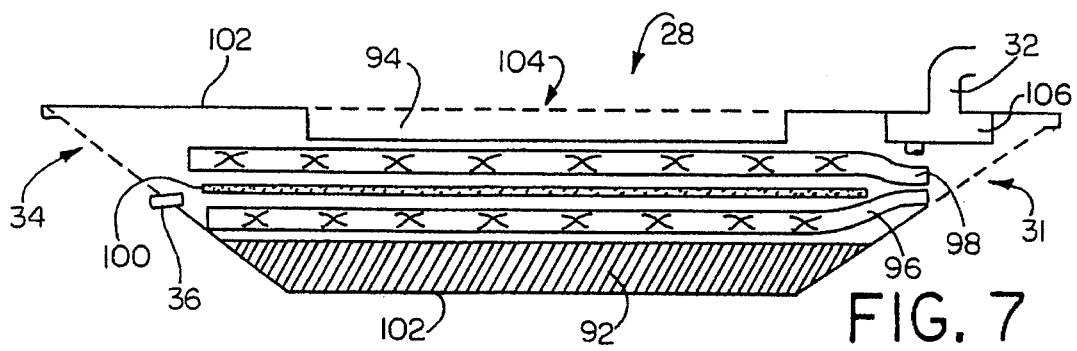
FIG. 7 is a cross-sectional view of an electrolyte starved zinc-air cell.

As noted above, the exemplary battery 12 may include a number of metal-air cells, for example a zinc-air cell 28 as is shown in cross-section in FIG. 7. The cell 28 includes an anode 92, a cathode 94, at least two electrolyte absorbers 96 and 98 and a separator 100 encased and maintained in place by a casing 102. The anode 92 is located in the bottom of the casing 102 and is made preferably of a zinc paste. Located in the cell 78 opposite the zinc anode 92 is the air cathode 94. The air cathode 94 is positioned immediately below openings or vents 104 in the top of the casing 102 to permit air to contact and flow across the air cathode. The air cathode 94 is preferably in the form of an air permeable woven or non-woven carbon membrane or similar material with a high affinity for oxygen.

Disposed between the zinc anode 92 and the air cathode 94 are the electrolyte absorbers 96 and 98 which supply electrolyte to the zinc anode and air cathode, respectively. The separator 100 separates the anode electrolyte absorber 96 from the cathode electrolyte absorber 98 and rejects the flow of zinc ions toward the air cathode 94 from the zinc anode 92.

Each zinc-air cell 28, or each group of cells at the same electrical potential, includes an electrolyte injector port 32 located near the top of the cell and at the end 31 of the cell which is elevated (hereinafter the supply side) when the cell is arranged with other cells in the battery 10. Each electrolyte injector port 32 is connected to a separate manifold output 66 through a feed line 68 (shown in FIGS. 1 and 4). Located at the other end 34 of the each cell 28 (hereinafter the drain side) is one or more electrolyte drains 36 for removing excess electrolyte from the cell. A reservoir 106 is provided between the injector port 32 and the electrolyte absorbers for storing and slowly dispersing electrolyte to the cathode electrolyte absorber 98 and anode electrolyte absorber 96 for supply to the air cathode 94 and zinc anode 92, respectively.

Referring back to FIG. 1, during operation of the electrolyte starved zinc-air battery 12, the excess electrolyte is drained from each cell 28 via the drain 36 and is collected in the collecting tank 16 through drain line 38. The drained excess electrolyte is thicker than the electrolyte supplied to the cells due to carbonation of the electrolyte and water loss from the electrolyte. Preferably, carbonation is filtered out of the excess electrolyte by passing the electrolyte immediately upon drainage through a carbonation filter 108 attached horizontally across the collecting tank 16. Subsequently, the filtered electrolyte is rehydrated by, preferably, adding diluted electrolyte from the storage tank 110 to the collecting tank 16, although pure water can be used. Diluted electrolyte is preferable to pure water because its freezing point is below 0° F. compared to a freezing point of 32° F. for water. The electrolyte is then pumped to the accumulator tank 20 by the pump 18 over the return line 112. A one-way valve 114 is attached to the return line 112, between the pump 18 and the collecting tank 16, to prevent electrolyte from backing up into the collecting tank 16.

The accumulator tank 20 holds the electrolyte until a certain pressure is detected by the pressure sensor 22, for example 30 psi. When electrolyte in the accumulator tank 20 reaches this pressure, the pressure switch 26 is triggered shutting off the pump 18. The flow of electrolyte stored in the accumulator tank 20 to the dispensing system 14 is controlled by a solenoid valve 24 which is operated in accordance with the electrolyte requirements of the dispensing system as determined by the microprocessor 27. Once the pressure of the electrolyte supplied by the accumulator tank 20 decreases to a certain pressure, for example 15 psi, the pressure switch 26 is again triggered, which activates the pump 18. The cycle is continually repeated. Supplying electrolyte under pressure counters the effect of hydraulic head, which affects the uniformity of the amount of electrolyte flowing to each cell such that, the farther the vertical distance between the electrolyte dispensing system 14 and the cell 28 being fed, the greater the amount of electrolyte dispensed, all other factors, like number or length of feedings, being equal.

The electrolyte supplied to each cell 28 via the feed lines 68 and electrolyte injector port 32 is slowly dispersed within the cell of the electrolyte absorbers 96 and 98 (FIG. 7). Due to the inclination of the cells 28, at about a 6° to 10° angle to horizontal, and the hydrophilic nature of the electrolyte absorbers 96 and 98, the electrolyte is absorbed across substantially the entire length of each electrolyte absorber from the elevated side 31 of the cells 28, to the lower side 34 of the cells. Any excess electrolyte not absorbed by the electrolyte absorbers 96 and 98, collectively drains from the cells 28 at the drains 36 into the collecting tank 16 through the drain line 38. The slight incline also prevents percolation and venting of the electrolyte up through the input on the elevated side each cell. The recycling phase of the excess electrolyte is then begun again.

During a blowing operation which may take place between successive electrolyte replenishing cycles to clear electrolyte from the feed lines 68, the solenoid valve 24 is closed while the solenoid valve 25 is opened to couple the air supply 116 to the electrolyte distributing system 14 through the supply line 60. The air supply 116 is preferably at a pressure about 5 psig above the pressure of the electrolyte supply line 112.

Figure 8:
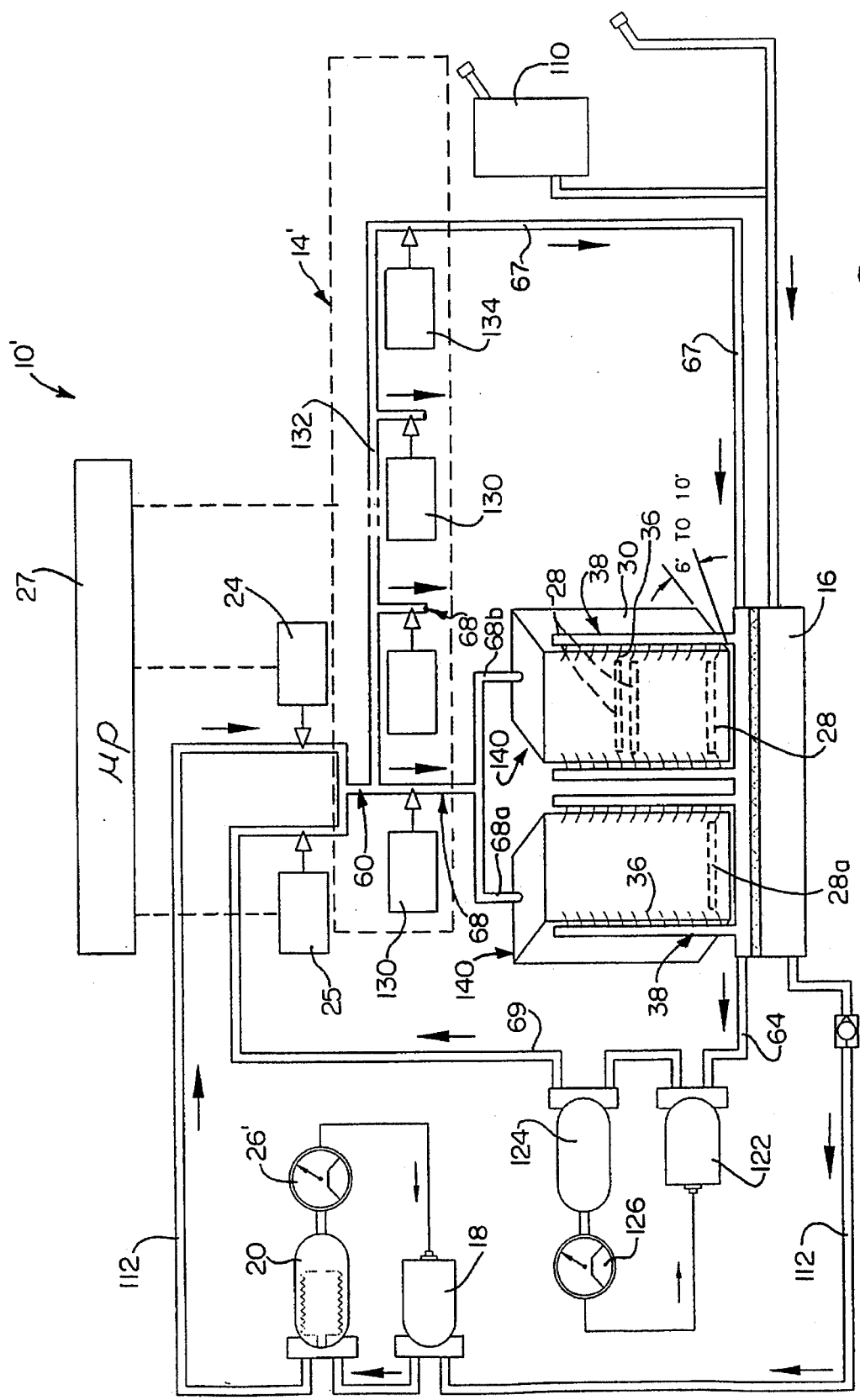
FIG. 8 is a schematic illustration of a battery system including an alternate electrolyte distributing system used with an electrolyte starved zinc-air battery.

A battery system 10' employing an alternate embodiment of an electrolyte distributing system 14' is shown in FIG. 8. In addition to the electrolyte distributing system 14', the battery system 10' includes an electrolyte collecting tank 16, a pump 18, an accumulator tank 20, solenoid valves 24 and 25 and a combined pressure sensor and switching element (pressure valve) 120 for controlling operation of the pump. Control of the solenoid valves 24 and 25 and the electrolyte distributing system 14' is performed by a microprocessor 27. The scrubbed air supply 69 is shown in more detail than in FIG. 1 and includes a compressor 122, a receiver 124 and a pressure valve 126. Scrubbed air is supplied from the collecting tank 16 over line 69 to the compressor where the pressure of the air is increased to and stored at approximately 5 psig above the pressure of the electrolyte in supply line 112. The scrubbed air is further supplied to the distributing system 14' over line 60 when the solenoid valve 25 couples lines 69 and 60 as controlled by the microprocessor 27.

The distributing system 14' employs a number of solenoid valves 130, each controllably coupling supply line manifold 132, which is supplied electrolyte or scrubbed air from the supply line 60, to a feed line 68 to provide electrolyte or scrubbed air to a cell 28. One or more solenoid valves 134 are also included as flushing ports coupling the manifold supply line 132 to a flushing line 67 for routing electrolyte directly to the collecting tank 16.

In FIG. 8 the battery 12 is illustrated as two separate banks 140 of cells 28 to indicate one instance where a single feed line 68 and solenoid valve 130 may feed electrolyte to a group of cells at the same electric potential. In such an instance the feed line 68 would branch into separate feed lines 68a and 68b which would be routed to the inputs (not shown) of cells 28a and 28b, respectively, in each cell bank 140 at approximately the same potential.

In operation, during a replenishing cycle, the processor 27 typically sequentially instructs each of the solenoid valves 130 to couple a feed line 68 to the supply manifold line 130 to establish a path between a cell 28 and the supply line 60. The processor 27 then instructs one of the solenoid supply valves 24 or 25 to supply electrolyte or scrubbed air to the supply line 60 for flow to a cell 28 for a desired period of time. The time may be adjusted in accordance with the specific electrolyte requirements of a cell 28. For instance, if through monitoring of the cell voltage between the anode 92 and cathode 94 of a cell 28, it is determined that the voltage is lower than optimal, the processor 27 may increase the duration of time that the solenoid valve 24 is pulsed open to increase the amount of electrolyte supplied to the cell. It is also possible to control the supply of electrolyte to the cell by the controlling the individual solenoid valves 132 while leaving supply valves 24 or 25 open, but as the solenoids 130 may have a slower response time than the solenoid valves 24 and 25 because of the possibility of employing valves with reduced size and power requirements for the valves 130, it may be beneficial to pulse the more responsive solenoid valves 24 or 25 to more accurately control fluid flow to the cell. Similarly, electrolyte is flushed through the system 10 by opening solenoid valve 134 to couple the flush line 67 to the supply line 60 and then opening supply valve 24 for the desired period of time.

Between successive replenishing cycles, air may be blown through the feed lines 68 in the same manner in which electrolyte was added to the cells, with the exception that the supply valve 25 is pulsed on and off to deliver air to the feed lines coupled to the supply line 60 by respective solenoid valves 130.

While a preferred example of the invention has been shown and described, numerous variations and alternate examples will occur to those skilled in the art, without departing from the spirit and scope of the present invention. Accordingly, it is intended that within the scope of the appended claims, the present invention may be practiced otherwise than as specifically described herein. It is to be realized that only a preferred example of the invention has been described and that numerous substitutions, modifications and alterations are permissible without departing from the spirit and scope of the invention as defined in the following claims. Thus, the scope of the invention should be determined by the appended claims and their legal equivalents, rather than by the examples given.

What is claimed is:

1. A method of providing electrolyte to an electrolyte starved battery, comprising the steps of:

supplying electrolyte from a source to a dispenser;

rotating said dispenser to dispense the electrolyte from said dispenser sequentially to each of a plurality of electrolyte inputs in the electrolyte starved battery.

2. The method of claim 1, wherein at least a portion of said source of electrolyte is excess electrolyte drained from said battery.

3. An electrolyte dispensing device, comprising:

a rotating dispenser and stationary manifold;

said rotating dispenser including a dispenser input, a dispenser output confronting said stationary manifold and a first electrolyte passageway leading from said dispenser input to said dispenser output; and said stationary manifold having plural electrolyte passageways, each passageway having a manifold input confronting said rotating dispenser and a manifold output, said manifold inputs being arranged along a circular path circumscribed by said dispenser output as said rotating dispenser rotates, and wherein each said manifold output is coupled to an electrolyte input of a battery cell.

4. The dispensing device of claim 3, wherein said rotating dispenser is in the shape of a disk.

5. The dispensing device of claim 3, wherein said rotating dispenser includes a shaft extending at least partially through said stationary manifold.

6. The dispensing device of claim 3, wherein said manifold is in the shape of a disk and said manifold outputs are located around the circumference of said manifold.

7. The dispensing device of claim 3, including a rotating joint coupling for coupling a supply of electrolyte to said dispenser input.

8. The dispensing device of claim 3, wherein said rotating dispenser and said stationary manifold have flat, contacting surfaces.

9. The dispensing device of claim 8, wherein said rotating dispenser is biased against said stationary manifold.

10. The dispensing device of claim 9, said flat, contacting surfaces coacting to close said dispenser output when not aligned with a manifold input.

11. The dispensing device of claim 3, wherein said rotating dispenser is chain driven.

12. The dispensing device of claim 3, said rotating dispenser and said stationary manifold being comprised of at least one polyolefin.

13. The dispensing device of claim 3, wherein at least one manifold output is coupled to a collecting tank for collecting electrolytes.

14. The dispensing device of claim 3, wherein said dispenser input is selectively coupled between a source of electrolyte and a source of pressurized air.

15. An electrolyte dispensing device, comprising:

a rotating dispenser and stationary manifold;

said rotating dispenser including a dispenser input, a dispenser output confronting said stationary manifold and a first electrolyte passageway leading from said dispenser input to said dispenser output; and said stationary manifold having plural electrolyte passageways, each passageway having a manifold input confronting said rotating dispenser and a manifold output, said manifold inputs being arranged along a circular path circumscribed by said dispenser output as said rotating dispenser rotates, wherein said manifold outputs are coupled to battery cells, such that battery cells having relatively large potential differences are coupled to non-adjacent manifold outputs.

16. An electrolyte dispensing device, comprising:

a supply valve for selectively coupling a supply of electrolyte to a manifold;

a plurality of feed valves, each feed valve selectively coupling said manifold to an electrolyte input or at least one battery cell;

a processor for controlling said supply valve and said feed valve to generally sequentially provide electrolyte to said battery cells; and an air supply valve for selectively coupling a supply of air to said manifold.

17. An electrolyte dispensing device, comprising: a supply valve for selectively coupling a supply of electrolyte to a manifold;

a plurality of feed valves, each feed valve selectively coupling said manifold to an electrolyte input or at least one battery cell;

a processor for controlling said supply valve and said feed valve to generally sequentially provide electrolyte to said battery cells; and at least one flushing valve for bypassing said battery cells and coupling said manifold to an electrolyte collecting tank.

* * * * *